(12) United States Patent
Baker et al.

(10) Patent No.: US 12,346,607 B2
(45) Date of Patent: Jul. 1, 2025

(54) COMPUTER SYSTEM AND METHOD FOR DATA ACCESS

(71) Applicant: Luminous Computing, Inc., Santa Clara, CA (US)

(72) Inventors: Dave Baker, Santa Clara, CA (US); Anahita Shayesteh, Santa Clara, CA (US); Mitchell A. Nahmias, Santa Clara, CA (US); Vishal Kasliwal, Santa Clara, CA (US)

(73) Assignee: Luminous Computing, Inc., Santa Clara, CA (US)

( * ) Notice: Subject to any disclaimer, the term of this patent is extended or adjusted under 35 U.S.C. 154(b) by 209 days.

(21) Appl. No.: 18/462,096

(22) Filed: Sep. 6, 2023

(65) Prior Publication Data

US 2024/0078046 A1 Mar. 7, 2024

Related U.S. Application Data

(60) Provisional application No. 63/404,077, filed on Sep. 6, 2022.

(51) Int. Cl.
*G06F 3/06* (2006.01)
(52) U.S. Cl.
CPC .......... *G06F 3/0659* (2013.01); *G06F 3/0611* (2013.01); *G06F 3/0683* (2013.01)

(58) Field of Classification Search
CPC .... G06F 3/0659; G06F 3/0611; G06F 3/0683; G06F 15/17331
See application file for complete search history.

(56) References Cited

U.S. PATENT DOCUMENTS

| | | | |
|---|---|---|---|
| 6,430,656 B1* | 8/2002 | Arimilli ................ | G06F 12/121 711/E12.07 |
| 2014/0059286 A1* | 2/2014 | Matsuo ................ | G11C 7/1072 711/147 |
| 2018/0136875 A1* | 5/2018 | Nimmagadda ....... | G06F 3/0659 |

* cited by examiner

*Primary Examiner* — Francisco A Grullon
(74) *Attorney, Agent, or Firm* — Stratford Group Ltd.

(57) ABSTRACT

A computer system comprises one or more processing units and a plurality of memory locations interconnected by a plurality of data links, each processing unit comprising a data request engine and a processor. A method for accessing data in memory of the computer system, includes: receiving a data access job at a first data request engine specifying data to be accessed; and generating a plurality of memory access requests to request the plurality of data partitions needed to fulfill the data access job. The plurality of memory access requests are then delivered to the plurality of memory locations, and the plurality of data partitions are copied or moved from the plurality of memory locations to the first processing unit via the data links. The data access job specifies a plurality of data partitions of a source data structure distributed over the plurality of memory locations of the computer system. One purpose of this computer system is to accelerate the accessing of the rows or vectors in an embedding table for machine learning.

17 Claims, 6 Drawing Sheets

EMBEDDING TABLE OFFSET ARRAY ENTRIES 64-bit Offset Array Entry 32-bit Offset Array Entry 16-bit Offset Array Entry 8-bit Offset Array Entry

COMPUTER SYSTEM AND METHOD FOR DATA ACCESS

TECHNICAL FIELD

The present disclosure relates to a computer system, and in particular to a computer system and method for data access.

BACKGROUND

Random access memory (RAM) is the memory in a computer that is used to store running programs and data for the programs. Data in the RAM can be read and written quickly in any order. Normally, RAM is in the form of computer chips. Usually, the contents of RAM are accessible faster than other types of information storage; however, RAM is volatile, whereby every time the computer is turned off, all the data in the RAM is lost. Non-volatile random-access memory (NVRAM), which maintains the data without using power, is more expensive but works slower. Dynamic random access memory (DRAM) is the majority in computers. Modern computers use several types of DRAM. Before 2002, most computers used single data rate (SDR) RAM. Most computers made since then use either double data rate (DDR), DDR2, DDR3, or DDR4 RAM. The later types allow stored data to be moved and used more quickly, so that the computer's processor can keep working quickly without having to wait for data as long or as often.

Using virtual memory, a computer can combine permanent storage with RAM to create a bigger pool of storage. This is useful when the RAM does not have enough space to store any more information. The extra data is then placed in the permanent storage instead of the RAM. The method has a limitation which is that permanent storage is often slower than RAM, which can slow down a computer. By eliminating the need for any form of virtual memory, the 64-bit physical address of the present invention enables any byte in the data center to be accessed by any processor at the same address. Software caching is used via memcpy to pre-position the data where it will be needed before computation begins.

Information that the computer constantly requires is normally kept in read-only memory (ROM), which is not wiped clean when the computer is turned off. Such items include the BIOS (Basic Input/Output System), which stores the most basic commands for the computer, e.g. instructions on how to start up. The BIOS also tells the computer how to input and output information.

Partitioning is the database process where very large tables are divided into multiple smaller parts. By splitting a large table into smaller, individual tables, queries that access only a fraction of the data can run faster because there is less data to scan. The main goal of partitioning is to aid in maintenance of large tables and to reduce the overall response time to read and load data for particular operations.

Embedding learning is an important technique in deep recommendation models to map categorical features to dense vectors. However, the embedding tables often demand an extremely large number of parameters, which become the storage and efficiency bottlenecks. Distributed training solutions have been adopted to partition the embedding tables into multiple devices. However, the embedding tables can easily lead to imbalances if not carefully partitioned. These embedding tables are accessed in essentially random but highly skewed distributions. The embedding vectors or tensors themselves tend to be large leading to difficult and time consuming accesses.

An object of the present disclosure is to provide a more effective and efficient computer system and method of memory access.

SUMMARY

Accordingly, a first embodiment includes a method for accessing data in memory of a computer system, comprising one or more processing units and a plurality of memory locations interconnected by a plurality of data links, each processing unit comprising a data request engine and a processor, the method comprising:
  receiving a data access job at a first data request engine from a first processor of a first processing unit of the one or more processing units, specifying data to be accessed, the data access job specifying a plurality of data partitions of a source data structure distributed over the plurality of memory locations of the computer system;
  generating a plurality of memory access requests at the first data request engine to request the plurality of data partitions needed to fulfill the data access job by providing the plurality of memory access requests to the plurality of memory locations using the data links extending from the first processing unit;
  handling the plurality of memory access requests including delivering the plurality of memory access requests to the plurality of memory locations, outputting the plurality of data partitions, and copying or moving the requested plurality of data partitions from the plurality of memory locations to the first processing unit via the data links;
  receiving the plurality of data partitions at the first processing unit; and
  performing computations using the plurality of data partitions requested by the data access job.

According to any of the aforementioned embodiments the data access job may specify one or more rows of an embedding table.

According to any of the aforementioned embodiments some data partitions may be stored elsewhere within the computer system, closer to the first processing unit.

According to any of the aforementioned embodiments some data partitions may be stored in local memory within the first processing unit.

According to any of the aforementioned embodiments the data access job may include memory locations of the plurality of data partitions to be accessed, including a set of indices of rows of the embedding table, and a size of the plurality of data partitions to be accessed.

According to any of the aforementioned embodiments the memory locations may be provided in the data access job as an indices pointer to the set of indices.

According to any of the aforementioned embodiments the data access job may include one or more source pointers to the plurality of data partitions stored in the plurality of memory modules including one or more selected from remote, local and nearby memory.

According to any of the aforementioned embodiments the data access job may include one or more destination locations to which the plurality of data partitions are to be copied.

According to any of the aforementioned embodiments the one or more destination locations may be provided in the data access job as a destination pointer.

According to any of the aforementioned embodiments the data access job may include:
- a quantity of how many data partitions in the plurality of data partitions;
- a size of each of the plurality of data partitions to be copied;
- a data partitions list pointer to a memory location storing a list of memory locations of the plurality of data partitions;
- one or more source pointers to the plurality of data partitions stored in the plurality of memory modules, including one or more selected from remote memory, local memory, and nearby memory;
- a destination pointer allocated in local memory.

According to another embodiment includes a computer system comprising:
- one or more processing units, each processing unit including a data request engine, a processor, and local memory;
- a plurality of memory modules; and
- data links interconnection at least one of the one or more processing units and the plurality of memory modules;

wherein the computer system is configured for:
- receiving a data access job at a first data request engine from a first processor of a first processing unit of the one or more processing units, specifying data to be accessed, the data access job specifying a plurality of data partitions of a source data structure distributed over the plurality of memory modules;
- generating a plurality of memory access requests at the first data request engine to request the plurality of data partitions needed to fulfill the data access job by providing the plurality of memory access requests to the plurality of memory modules using the data links extending from the first processing unit;
- handling the plurality of memory access requests including delivering the plurality of memory access requests to the plurality of memory modules, outputting the plurality of data partitions, and copying or moving the requested plurality of data partitions from the plurality of memory modules to the first processing unit via the data links;
- receiving the plurality of data partitions at the first processing unit; and
- performing computations using the plurality of data partitions requested by the data access job.

According to any of the aforementioned embodiments the data links may interconnect each of the one or more processing units to a subset of the plurality of memory modules, and each of the one or more processing units to a subset of the other processing units of the one or more processing units.

According to any of the aforementioned embodiments the data links may include a separate data link connecting each of the one or more processing units to all other of the plurality of processing units and to each one of the plurality of memory modules.

According to any of the aforementioned embodiments the data links may directly interconnect each of the plurality of processing units to each of the plurality of memory modules, and each of the one or more processing units to all other of the plurality of processing units.

According to any of the aforementioned embodiments the data links may include a separate data link directly connecting each of the one or more processing units to all other of the one or more processing units and to each of the plurality of memory modules.

According to any of the aforementioned embodiments the system may further comprise a switch system provided for directing signals between each of the one or more processing units and each of the plurality of memory modules.

According to any of the aforementioned embodiments the data access job may include a threshold value register; the method further comprising: comparing each offset of an embedding table entry, whereby when the offset is less than or equal to the threshold a pointer to a local fragment of the embedding table is used to determine the embedding table entry location; and when the offset is greater than the threshold value then the embedding table entry location is found by applying the offset or the offset minus the threshold to a pointer to a remote embedding table in the external memory, whereby a software cache located in local memory is greatly accelerated using burst transfers of the row lengths either in local memory or external memory.

BRIEF DESCRIPTION OF THE DRAWINGS

Some example embodiments will be described in greater detail with reference to the accompanying drawings, wherein.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
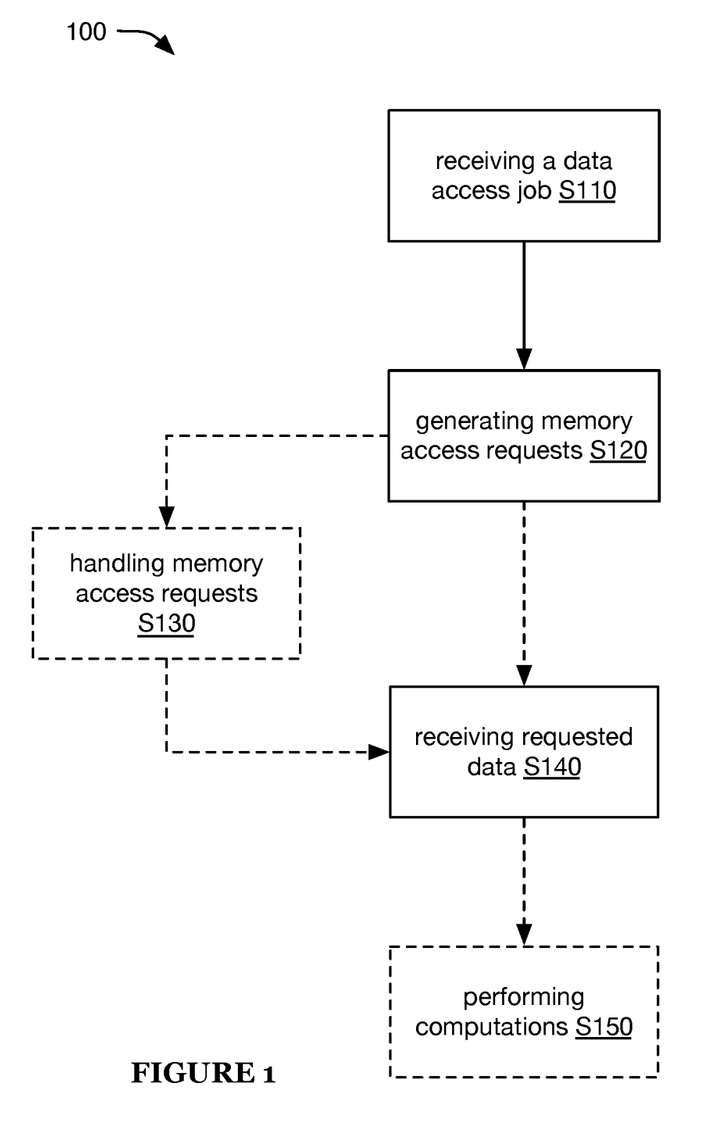
FIG. 1 is a schematic representation of an embodiment of a method for data access.

With reference to FIG. 1, a method 100 for data access preferably includes: receiving a data access job 50 in a first data access job step S110, generating memory access requests in a second generating step S120, and/or in a subsequent receiving data step 140 receiving requested data. The method 100 can optionally include a handling step S130 comprising handling memory access requests and/or a computation step S150 comprising performing computations. However, the method 100 can additionally or alternatively include any other elements performed in any suitable manner.

Figure 2A:
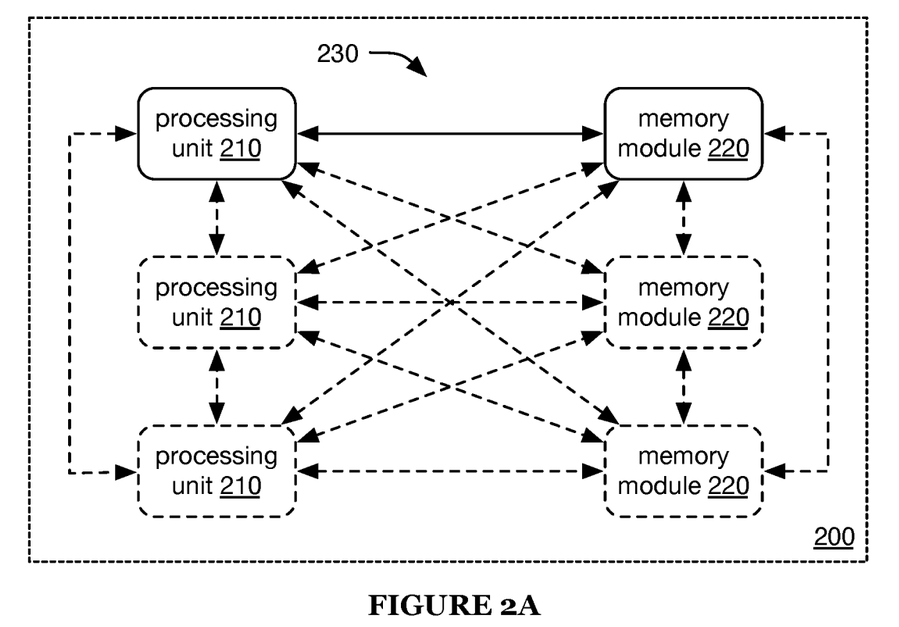
FIGS. 2A-2B are schematic representations of an embodiment of a computer system, and an example of the embodiment, respectively.
Figure 2B:
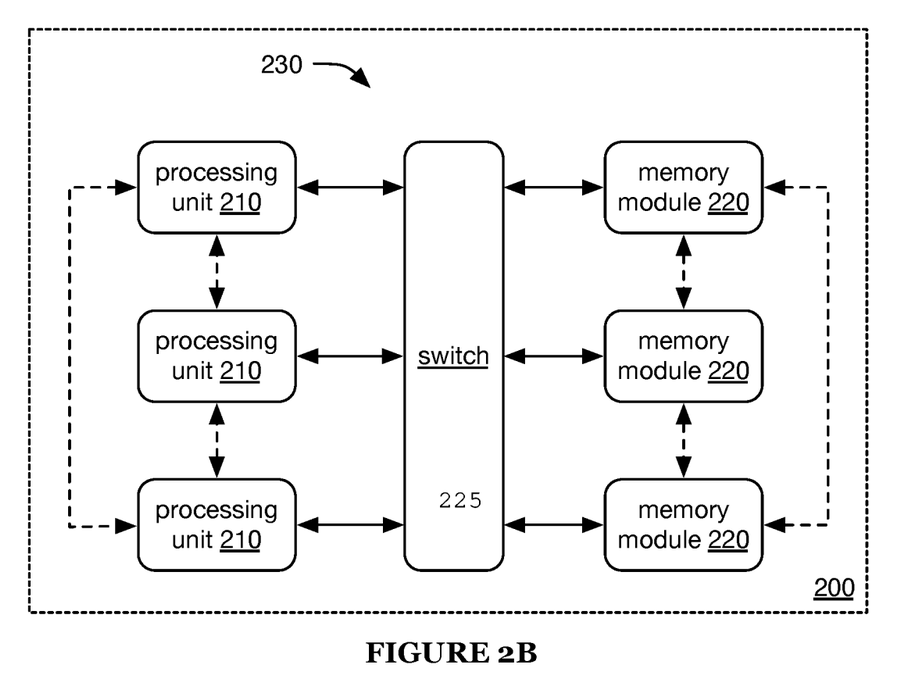
Figure 3A:
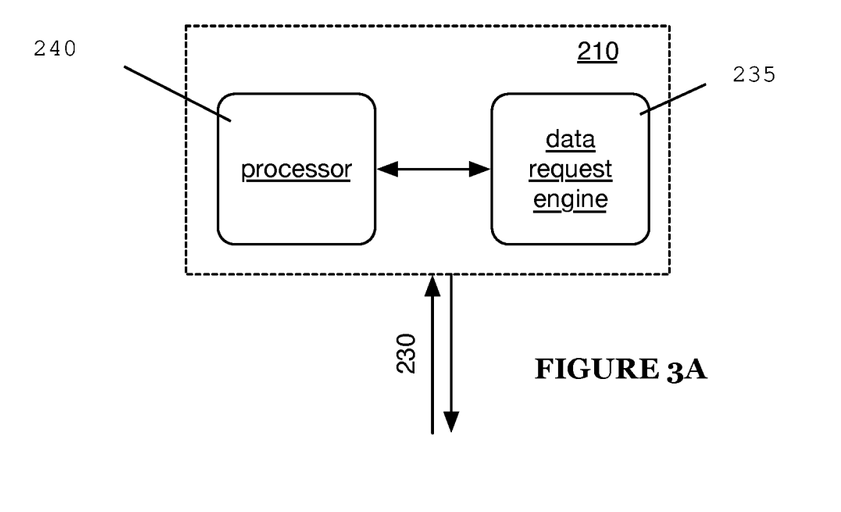
FIGS. 3A-3B are schematic representations of a first and second example, respectively, of a processing unit of the computer system.
Figure 3B:
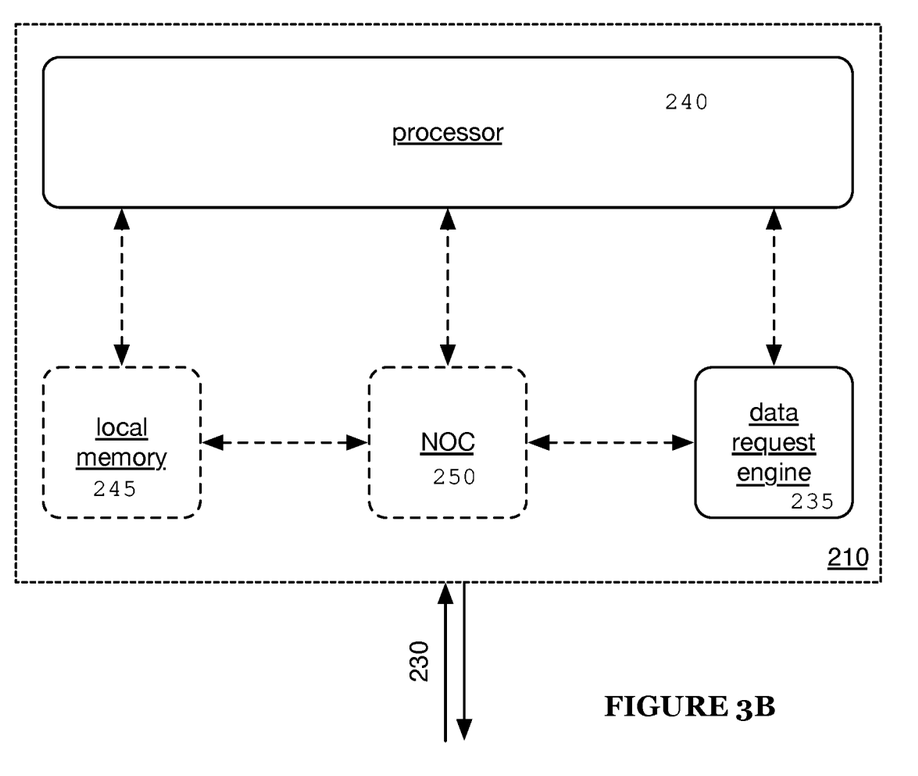

A computer system 200, illustrated in FIGS. 2A and 2B, preferably includes one or more processing units 210, memory modules 220, and/or data links 230 extending therebetween. Each processing unit 210 preferably includes a data request engine 235 and/or a processor 240, and can optionally include local memory 245 and/or a network-on-chip (NOC) 250, as illustrated in FIGS. 3A-3B, but can additionally or alternatively include any other suitable elements. However, the computer system 200 can additionally or alternatively include any other suitable elements in any suitable arrangement. The data links 230 directly interconnect each processing unit 210 to a plurality of, or preferably, each memory module 220, and each processing unit 210 to a plurality of, or preferably, each of the other processing units 210. Preferably, the data links 230 include a separate data link 230 directly connecting each processing unit 210 to one or more of the other processing units 210 and to each and every memory module 220, but a switch 225 may be provided for directing signals between each of the processing units 210 and each of the memory modules 220.

The method 100 is preferably performed using the computer system 200. However, the method 100 can additionally or alternatively be performed with any other suitable computer system and/or subset thereof, and/or with any other suitable system.

The step S110 of receiving a data access job 50 preferably functions to specify one or more sets of data to be accessed. The data to be accessed is preferably data required and/or desired for computation by a computer system 200, e.g. by one or more processing units 210 thereof. The data access job 50 preferably specifies one or more subsets of a source data structure. For example, the data access job 50 can specify one or more rows of a large embedding table (or other table).

The data access job 50 is preferably received at a data request engine 235 of a processing unit 210. The data access job 50 is preferably received from, e.g. generated by, one or more other elements of the processing unit 210 that includes the corresponding data request engine 235, such as generated by and/or received from the processor 240, e.g. via the NOC 250. However, the data access job 50 can additionally or alternatively be generated by and/or received from other processing units 210, e.g. nearby with respect to network topology, and/or any other suitable elements of the computer system 200.

The source data structure can optionally be partitioned in memory, e.g. distributed over a plurality of memory modules of the computer system 200 or other computer system. In a first example, the entire data structure (or a subset thereof) can be stored in a remote memory, e.g. at one or more memory modules 220 of the computer system 200 or some other computer system. Further, in this example, some partitions, e.g. horizontal partitions, and/or other fragments, e.g. partitions and/or other fragments of an embedding table that are anticipated to be relevant to current processing tasks, can additionally or alternatively be stored elsewhere within the computer system 200, e.g. closer to the processing unit 210 at which the data access job is generated and/or received. In examples, these portions can be stored in local memory, e.g. within the processing unit 210, in nearby memory, e.g. local memory of other processing units 210 close with respect to network topology to the processing unit 210, and/or in any other suitable locations.

The data access job 50 preferably includes, e.g. specifies, is indicative of, etc., the locations of the data partitions to be accessed. For example, the data access job 50 can include indices 51 into the source data structure, e.g. indices of desired rows of a table, such as an embedding table, and a size of the data partitions to be accessed, e.g. element size 52. In a specific example, these locations can be provided in the job as a pointer to a set, e.g. array, linked list, etc., of indices. Optionally, the data access job 50 can additionally specify one or more pointers to the source data structure, e.g. to the data partitions thereof stored in one or more memory locations selected from remote, local and/or nearby memory modules 220.

The data access job 50 can optionally include one or more destination locations, e.g. a first destination pointer 61 to a destination, such as a destination in local memory, e.g. memory module 220, to which the requested data should be copied. However, the data access job 50 can additionally or alternatively include any other suitable elements.

Figure 4:
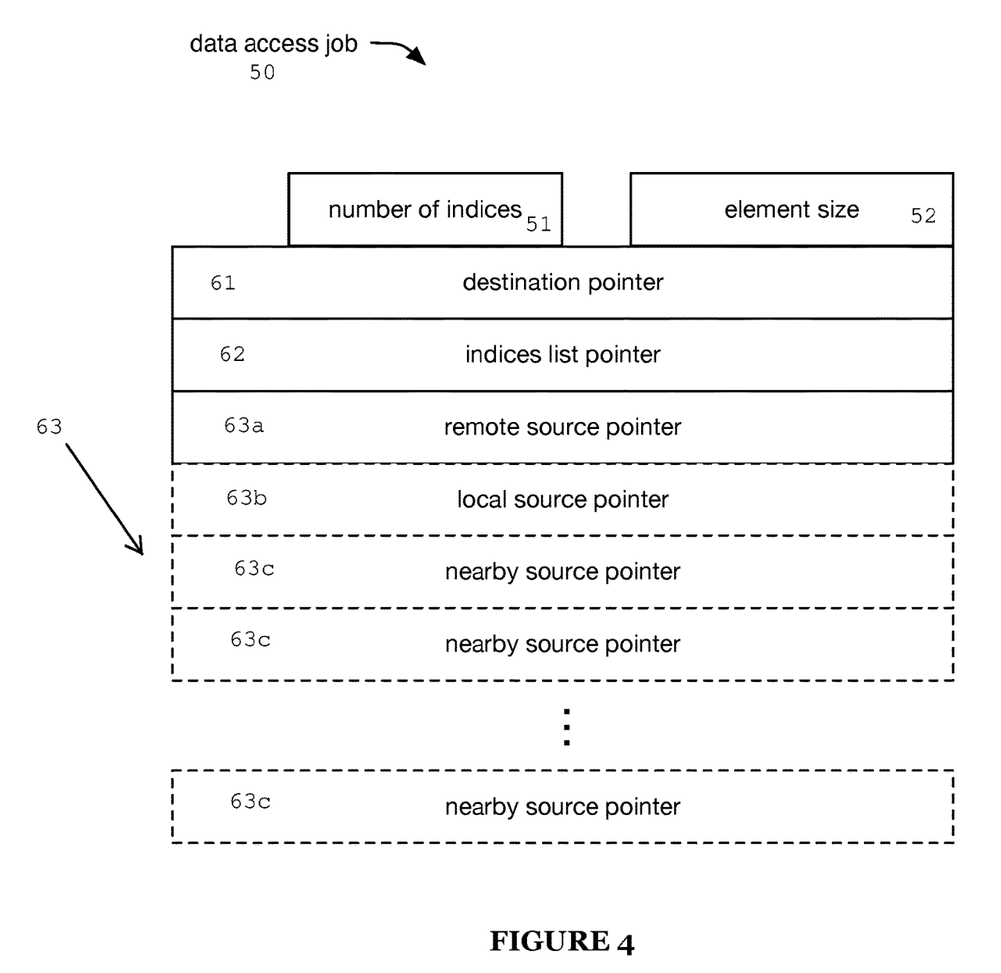
FIG. 4 is a schematic representation of an example of a data access job of the computer system and/or the method for data access to embedding table entries as used in machine learning applications.

In a specific example, as illustrated in FIG. 4, the data access job 50 specifies some or all of the following elements: a second indices pointer 62 to a list of indices, e.g. locations stored in local memory; the number or quantity of indices 51 in the list; the element size 52 of each partition or element, e.g. row, to be copied; the first destination pointer 61, e.g. allocated in local memory; and one or more source pointers 63, e.g. a remote source pointer 63a, such as into a unified memory space defined by a plurality of memory modules, one or more local source pointers 63b directed to local memory, and/or one or more nearby source memory pointers 63c directing to nearby memory. However, the first step S110 can additionally or alternatively include receiving any suitable data access job 50 in any other suitable manner.

The second step S120 of generating memory access requests is preferably performed at the data request engine 235, e.g. at the data request engine 235 that received the data access job 50 in the first step S110. The second step S120 is preferably performed based on, e.g. in response to receipt of, a data access job 50, but can additionally or alternatively be performed with any other suitable timing. The second step S120 preferably functions to request, e.g. rapidly request, the data needed to fulfill a data access job 50. For example, the second step S120 can include providing a plurality of requests to a plurality of memory locations, e.g. memory modules 220, by saturating outbound data links 230 extending from the processing unit 210 with the plurality of requests, thus potentially enabling rapid, e.g. data link limited, provision of the requested data.

For each subset of the data access job 50, e.g. each index into the source data structure, such as each row of an embedding table, the second step S120 preferably includes determining a source location, generating an associated memory access request, and outputting the memory access request, and optionally includes determining a destination location.

Determining the source location in memory, e.g. determining a pointer 63 to the source, can be performed based on the source pointer 63 of the data access job 50, the specified indices 51 of the subset, and the element size 52 of each indexed partition or element, e.g. row, in the source data structure. For example, the source location pointer 63 can be calculated as the source point of the data access job 50 plus the product of the indexed element size 52 and the specified indices 51.

In some examples, the destination location in memory, e.g. pointer 61 to the destination, can be determined by incrementing the previous destination pointer 61, e.g. from the previous subset of the data access job 50, by the size of indexed elements. Additionally or alternatively, the destination location pointer 61 can be determined based on the data access job destination pointer, the number of subsets processed so far, and the size of each indexed element, e.g.

equal to the data access job destination pointer plus the product of the number of elements processed and the indexed element size.

In some examples, generating an associated memory access request, e.g. a memory copy request, can include generating a request that specifies the determined source location, e.g. the source pointer 63, a destination location, e.g. the destination pointer 61, and/or size of memory to be accessed, e.g. the element size 52 of each indexed element. The memory access request is preferably output via the NOC 250 and/or data links 230, e.g. output to the memory module 220 or processing unit 210 that holds the determined source location. However, each subset of the data access job can additionally or alternatively be processed in any other suitable manner, and/or the second step S120 can additionally or alternatively include generating and/or outputting any other suitable memory access requests.

The second step S120 preferably includes rapidly generating and outputting memory access requests for the entire data access job (or any suitable subset thereof). This can include queuing memory access requests for later generation and/or output as needed and/or desired, e.g. in response to saturation of one or more outbound data links needed to output the relevant request. However, the second step S120 can additionally or alternatively include generating and/or outputting memory access requests with any other suitable timing and/or in any other suitable manner.

The method 100 can optionally include the handling step 130, which comprises handling memory access requests, which can function to provide data specified by the memory access requests. For each memory access request, the handling step S130 can include delivering the memory access request, outputting the requested data, and/or delivering the requested data. The memory access request is preferably delivered to the relevant entity, e.g. the memory module 220 or the local memory of the processing unit 210 that includes the requested memory. The memory access request is preferably delivered via the data links 230 and/or the NOC 250, but can additionally or alternatively be delivered in any other suitable manner.

Outputting the requested data preferably includes copying (or moving) data from the specified memory location. The requested data is preferably output by the relevant entity, e.g. the memory module 220 or the processing unit 210, to which the memory access request was addressed and/or delivered, e.g. in response to receipt of the memory access request, but can additionally or alternatively be performed by any other suitable entities.

The requested data is preferably delivered to the destination, e.g. the processing unit 210 that generated the request, the destination specified in the memory access request, etc. The requested data is preferably delivered via the data links 230 and/or the NOC 250, such as in response to the output of the requested data. However, the handling step S130 can additionally or alternatively include handling memory access requests in any other suitable manner.

The receiving step S140, which comprises receiving the requested data, is preferably performed at the destination, e.g. at the processing unit 210 that generated the memory access requests and/or the data access job 50. The receiving step S140 preferably functions to receive data to fulfill, or partially fulfill, the data access job 50. The data is preferably received from local memory, from other processing units 210, e.g. from local memory thereof, such as nearby processing units 210, from memory modules 220, and/or from any other suitable entities. The data is preferably received via the data links 230 and/or the NOC 250 but can additionally or alternatively be received via any other suitable elements. The received data is preferably the data output in the step S130 but can additionally or alternatively include any other suitable data. However, the receiving step S140 can additionally or alternatively include receiving the requested data in any other suitable manner.

The method 100 can optionally include the computation step S150, which comprises performing computations. The computation step S150 is preferably performed at the destination. e.g. the processing unit 210, but can additionally or alternatively be performed by any other suitable elements in the system 200. The computation step S150 can function to use the data requested by the data access job 50. For example, the computation step S150 can include performing matrix operations, e.g. multiply-accumulate operations, on the data or one or more subsets thereof. However, the computation step S150 can additionally or alternatively include performing any suitable computations on data requested, generated, and/or received in performance of the method. Further, the method 100 can additionally or alternatively include any other suitable elements performed in any suitable manner.

Each processing unit 210 is preferably a vector processing unit (VPU), a matrix processing unit (MPU), a tensor processing unit (TPU), and/or any other suitable numerical processing unit, e.g., associated with linear algebra operations. However, the processing units 210 can additionally or alternatively include central processing units (CPUs), graphics processing units (GPUs), and/or any other suitable processing units.

Each processing unit 210 is preferably a single chip, e.g. is a single integrated circuit, and is defined on a single die. However, the processing unit 210 can alternatively be distributed over multiple chips, e.g. multiple chips arranged on a single board, on multiple networked boards, etc., and/or have any other suitable arrangement.

As described above, each processing unit 210 preferably includes a data request engine 235 and/or a processor 240, and can optionally include local memory 245 and/or a NOC 250. The data request engine 235 preferably functions to generate memory access requests, e.g., as described above regarding the method 100. The processor 240 preferably functions to perform computations, e.g. vector and/or matrix operations, multiply-accumulate operations, other computations. The local memory 245 can function to provide local, e.g. on-chip or on-board, data storage. In some examples, the local memory 245 can include static RAM (SRAM). However, the local memory 245 can additionally or alternatively include dynamic RAM (DRAM) and/or any other suitable memory. The NOC 250 can function to communicatively couple elements of the processing unit 210, e.g. the processor 240, the data request engine 235 and the local memory 245, to each other and/or to the data links 230. However, the processing units 210 can additionally or alternatively include any other suitable elements in any suitable arrangement.

The memory modules 220 preferably function to provide large-scale, e.g. computer system-wide, memory. The memory modules 220 preferably include DRAM, but can additionally or alternatively include SRAM and/or any other suitable memory, e.g. DDR, DDR2, DDR3, or DDR4, DDR5 or LPDDR5 RAM. In some examples, the memory of the memory modules 220 can be addressable as a unified memory space, e.g. a single unified memory space defined by a plurality of memory modules 220, such as by all, or substantially all, memory modules 220 of the computer system 200. For example, the computer system 200 can define a memory addressing scheme in which pointers roll over from one memory module 220 to the next, e.g. rather than addressing memory by specifying a particular memory module 220 and a local pointer 63b to memory within that memory module 220. However, the memory modules 220 can additionally or alternatively include any other suitable elements and/or have any other suitable functionality.

The data links 230 preferably function to communicatively connect the one or more processing units 210 to the one or more memory modules 220. For example, the data links 230 can provide all-to-all connectivity between each processing unit 210 and each memory module 220. Such connectivity is preferably moderated by a switch system comprised of one or more switches 225, e.g. packet-switched routers. Further, the data links 230 can additionally or alternatively enable connectivity, e.g. all-to-all connectivity, between the different processing units 210.

The data links 230 can include optical data connections, electrical data connections, and/or any other suitable data connections. In one example, the data links 230 include optical links between processing units 210 and electronic switches, and between memory modules 220 and the electronic switches, e.g. wherein optical signals propagating along the data links 230 are transduced into electrical signals at the switches, and then back into optical signals for transmission along other optical links 230.

The data links 230 preferably enable bidirectional communications, such as via pairs or larger groupings of unidirectional data links 230 with opposing directionality, e.g. one link for data transmission from a processing unit 210 or memory module 220 directly or to a switch 225, paired with a second link for data transmission directly from of via the switch 225 to the processing unit 210 or memory module 220. The data links 230 preferably include a plurality of unbonded lanes. However, the data links 230 can additionally or alternatively include bonded lanes.

However, the data links 230 can additionally or alternatively include any other suitable links in any suitable arrangement and/or having any other suitable functionality. Further, the computer system 200 can additionally or alternatively include any other suitable elements in any suitable arrangement.

Figure 5:
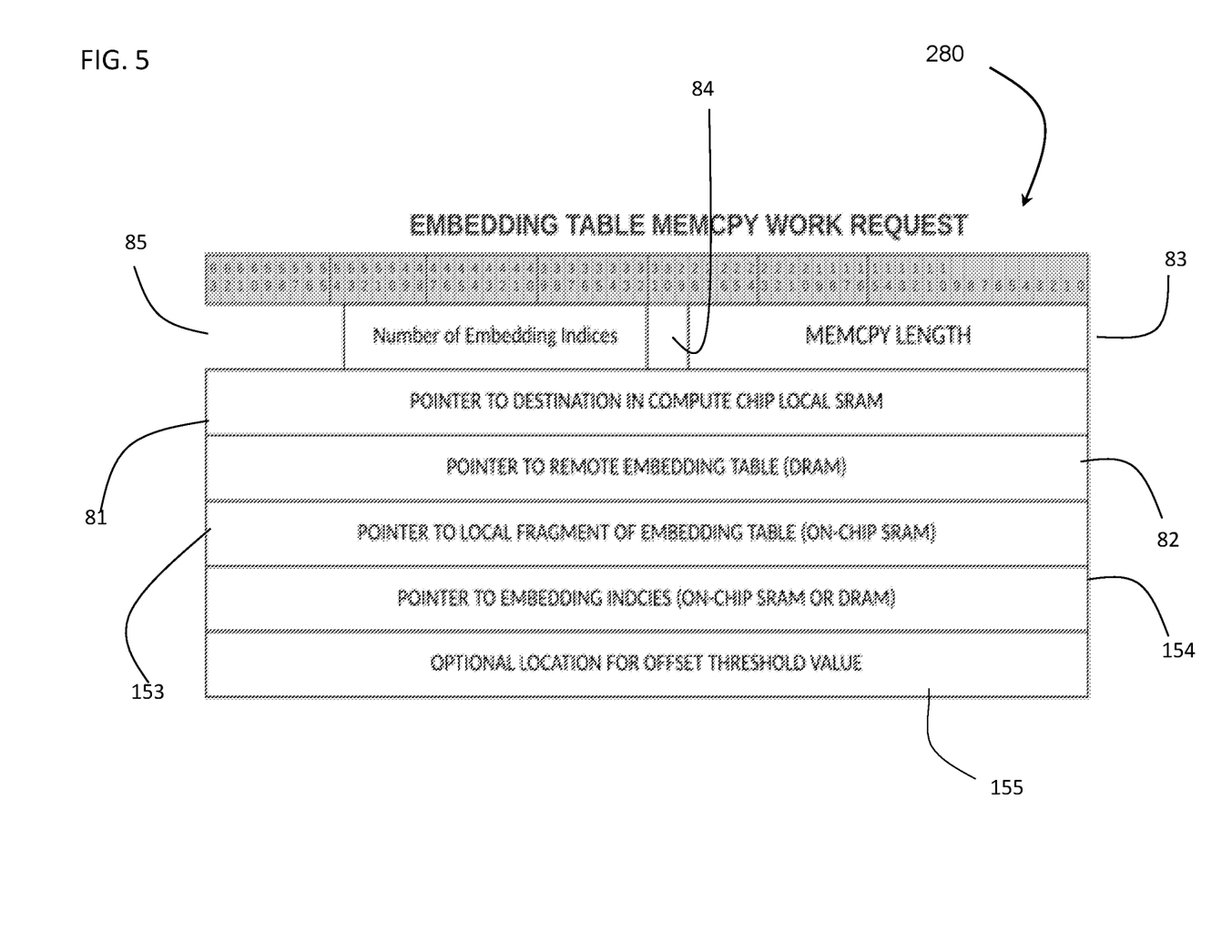
FIG. 5 is a schematic representation of an alternate example of a data access job of the computer system and/or the method for data access to embedding table entries as used in machine learning applications.
Figure 6:
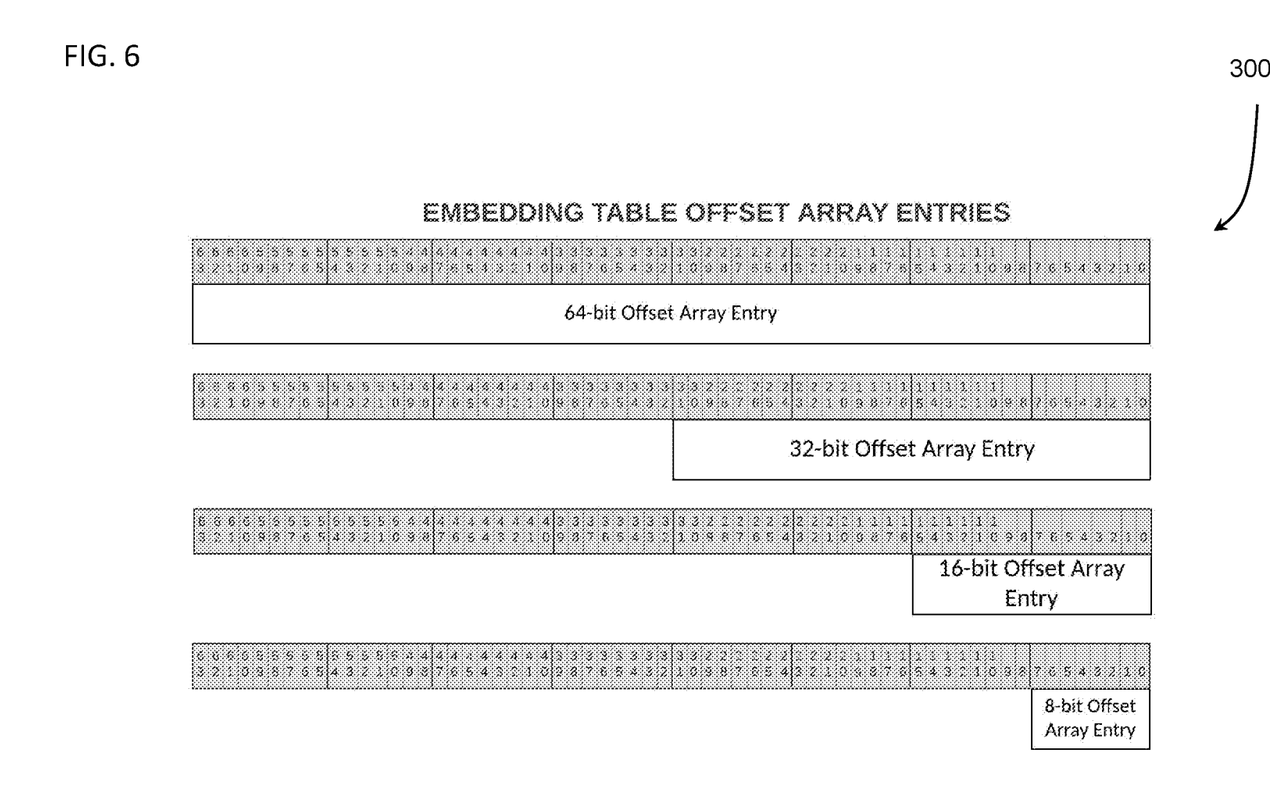
FIG. 6 is a schematic representation of an embedding table entry, i.e. one entry in an embedding table array.

With reference to FIG. 5, which illustrates the structure of a data access job 280 e.g. a VPU or MEMCPY work request, for performing embedding table lookups of an embedding table 300 (FIG. 6). Many fields may be essentially the same as a simple work request, which has a different command that indicates that it is looking up embedding table entries. That command makes more fields available. The length field 83 may indicate the size of the embedding table row to be looked up. The number of embedding table indices to fetch or copy into sequential locations indicated by the first pointer 81 is shown in the first word of the MEMCPY work request 280. The standard destination pointer 81 is used as the target of the MEMCPY operation but it is incremented by the length 83 as each MEMCPY or DMA request packet is transmitted to the NOC 250. The second pointer 82 (source) may point to the location the embedding table in the memory module 220, e.g. DRAM, although it could be anywhere in unified memory. The third pointer (computational) 153 can be used to implement a software cache in the local memory 245. The fourth pointer (memory) 154 may point to the embedding table indices (offsets) somewhere in unified memory.

When the MSB of the offset entry is zero, then the second pointer 82 is used as a base. When the MSB of the offset entry is one, then the third pointer 153 is used as the base.

It should be obvious to one skilled in the art, that alternative methods for identifying software cached embedding table rows can be indicated by using a comparator on offset indices and reserving the first N offset index values as cached offsets. In this case, one artificially adjusts the DRAM embedding table pointer (second pointer) 82, to account for the N reserved indices for embedding table rows that are cached. Other approaches are equally viable, including the use of other markers with an offset to indicate additional base address values that could be provided within the MEMCPY work request 280. Finally other ways to indicate the size of the indices might be included in the CMD field 84 or other fields within the memcpy work request 280. This would allow different data types for the indices themselves, e.g. 8-bit, 16-bit, 32-bit or 64-bit (See FIG. 6). Very small embedding tables do not need 64-bit indices while extremely large embedding tables may require 64-bit indices.

The data request (MEMCPY) engine 235 can perform more efficient copying of embedding table entries by following a list of offsets (indices). This hardware acceleration is for embedding lookups, which includes support for software caching of embedding table entries in the GOM (global on-chip memory) or local memory 245 of the processing units 210. To that end, an offset threshold register 155 may be provided in a register set of the data request (MEMCPY) engine 235 or as part of the data access job 280 (FIG. 5).

The EMB threshold register 155 sets a threshold between offset values that are found within the local memory of the processing units 210 and the range of offsets that are copied from embedding tables in the memory modules 220, e.g. DRAM. The data request (MEMCPY) engine 235 takes the next offset value from the index array and compares it to the threshold register. If the next offset value is less than or equal to the value of the threshold register 155 then the offset is looked up based on the pointer 153 to on-chip SRAM. If the next offset value is greater than the value of the threshold register then the offset is looked up using the pointer 82 to the memory modules 220, e.g. DRAM. Both of these pointers are carried in the work request 280. For each offset in the index array, the data request (MEMCPY) engine 235 formats packets of a MEMCPY request (s) 280 to copy that data embedding from a quasi-random location in the memory modules 220, e.g. DRAM, (or MGM software cache of the local memory 245) into an embeddings buffer in the MGM of the processing unit 210. The embeddings are copied one after the other beginning at the location specified in the DESTINATION pointer 81 in the MEMCPY work request 280.

Accordingly, a threshold value is compared to each offset/index into the embedding table, whereby when the offset is less than or equal to the threshold the third pointer 153, e.g. pointer to local fragment of embedding table is used. When the offset is greater than the threshold register value then the embedding table entry (row) is found by applying the offset or the offset minus the threshold to the second pointer 82, i.e. pointer to remote embedding table in the memory modules 220 or other external memory. Accordingly, a software cache located in local/on-chip memory (SRAM) 245 can be greatly accelerated using burst transfers of the row lengths either in local memory (SRAM) 245 or external memory 220, as appropriate.

Finally it should be noted that the threshold value can be stored either in a programmable register as described above, or it can be specified as an additional field 155 in the work request 280.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of one or more example embodiments has been presented for the purposes of illustration and description. It is not intended to be exhaustive or to limit the invention to the precise form disclosed. Many modifications and variations are possible in light of the above teaching. It is intended that the scope of the disclosure be limited not by this detailed description.

We claim:

1. A method for accessing data in memory of a computer system, comprising one or more processing units and a plurality of memory locations interconnected by a plurality of data links, each processing unit comprising a data request engine and a processor, the method comprising:
   receiving a data access job at a first data request engine from a first processor of a first processing unit of the one or more processing units, specifying data to be accessed, the data access job specifying a plurality of data partitions of a source data structure distributed over the plurality of memory locations of the computer system;
   generating a plurality of memory access requests at the first data request engine to request the plurality of data partitions needed to fulfill the data access job by providing the plurality of memory access requests to the plurality of memory locations using the data links extending from the first processing unit;
   handling the plurality of memory access requests including delivering the plurality of memory access requests to the plurality of memory locations, outputting the plurality of data partitions, and copying or moving the requested plurality of data partitions from the plurality of memory locations to the first processing unit via the data links;
   receiving the plurality of data partitions at the first processing unit; and
   performing computations using the plurality of data partitions requested by the data access job.

2. The method according to claim 1, wherein the data access job specifies one or more rows of an embedding table.

3. The method according to claim 2, wherein some data partitions are stored elsewhere within the computer system, closer to the first processing unit.

4. The method according to claim 3, wherein some data partitions are stored in local memory within the first processing unit.

5. The method according to claim 2, wherein the data access job includes memory locations of the plurality of data partitions to be accessed, including a set of indices of rows of the embedding table, and a size of the plurality of data partitions to be accessed.

6. The method according to claim 5, wherein the memory locations of the plurality of data partitions are provided in the data access job as an indices pointer to the set of indices.

7. The method according to claim 6, wherein the data access job includes one or more source pointers to the plurality of data partitions stored in the plurality of memory locations including one or more selected from remote, local and nearby memory.

8. The method according to claim 7, wherein the data access job includes one or more destination locations to which the plurality of data partitions are to be copied.

9. The method according to claim 8, wherein the one or more destination locations are provided in the data access job as a destination pointer.

10. The method according to claim 1, wherein the data access job includes:
    a quantity of how many data partitions in the plurality of data partitions;
    a size of each of the plurality of data partitions to be copied;
    a data partitions list pointer to a memory location storing a list of memory locations of the plurality of data partitions;
    one or more source pointers to the plurality of data partitions stored in the plurality of memory locations, including one or more selected from remote memory, local memory, and nearby memory;
    a destination pointer allocated in local memory.

11. A computer system comprising:
    one or more processing units, each processing unit including a data request engine, a processor, and local memory;
    a plurality of memory modules; and
    data links interconnection at least one of the one or more processing units and the plurality of memory modules;
    wherein the computer system is configured for:
    receiving a data access job at a first data request engine from a first processor of a first processing unit of the one or more processing units, specifying data to be accessed, the data access job specifying a plurality of data partitions of a source data structure distributed over the plurality of memory modules;
    generating a plurality of memory access requests at the first data request engine to request the plurality of data partitions needed to fulfill the data access job by providing the plurality of memory access requests to the plurality of memory modules using the data links extending from the first processing unit;

handling the plurality of memory access requests including delivering the plurality of memory access requests to the plurality of memory modules, outputting the plurality of data partitions, and copying or moving the requested plurality of data partitions from the plurality of memory modules to the first processing unit via the data links;

receiving the plurality of data partitions at the first processing unit; and performing computations using the plurality of data partitions requested by the data access job.

12. The system according to claim 11, wherein the data links interconnect each of the one or more processing units to a subset of the plurality of memory modules, and each of the one or more processing units to a subset of the other processing units of the one or more processing units.

13. The system according to claim 12, wherein the data links include a separate data link connecting each of the one or more processing units to all other of the one or more processing units and to each one of the plurality of memory modules.

14. The system according to claim 11, wherein the data links directly interconnect each of the one or more processing units to each of the plurality of memory modules, and each of the one or more processing units to all other of the one or more processing units.

15. The system according to claim 12, wherein the data links include a separate data link directly connecting each of the one or more processing units to all other of the one or more processing units and to each of the plurality of memory modules.

16. The system according to claim 11, further comprising a switch system provided for directing signals between each of the one or more processing units and each of the plurality of memory modules.

17. The method according to claim 10, wherein the data access job includes a threshold value register; the method further comprising: comparing an offset of an embedding table entry, whereby when the offset is less than or equal to the threshold value, a first memory pointer to a local fragment of the embedding table is used to determine an embedding table entry location; and when the offset is greater than the threshold value then the embedding table entry location is found by applying the offset or the offset minus the threshold value to a second memory pointer to a remote embedding table in the external memory, whereby a software cache located in local memory is greatly accelerated using burst transfers of row lengths either in the local memory or the external memory.

* * * * *